Nov. 22, 1927. 1,650,201
J. W. A. ELLING ET AL
CENTRIFUGAL FRICTION COUPLING
Filed Nov. 30, 1923
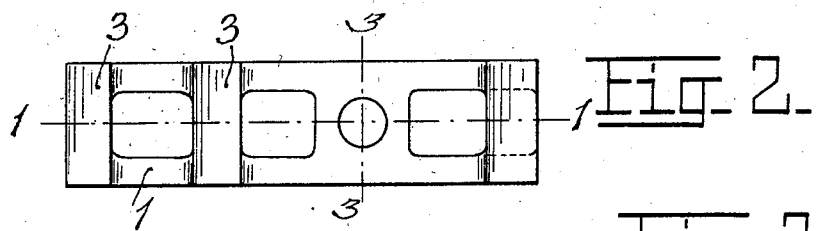
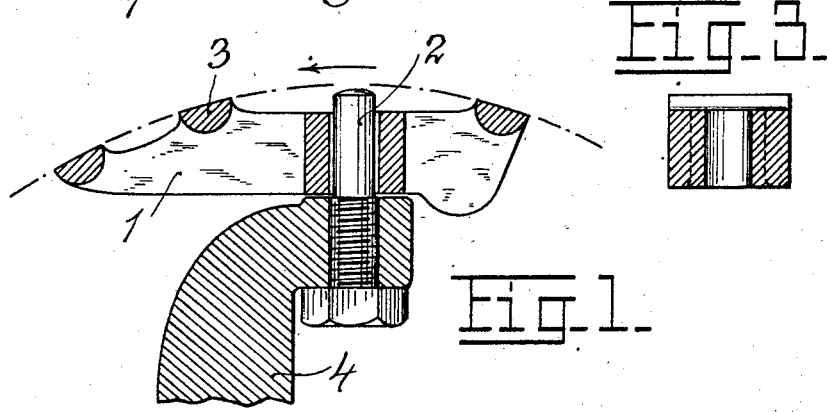
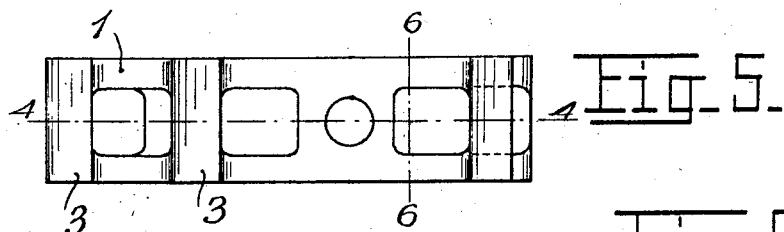
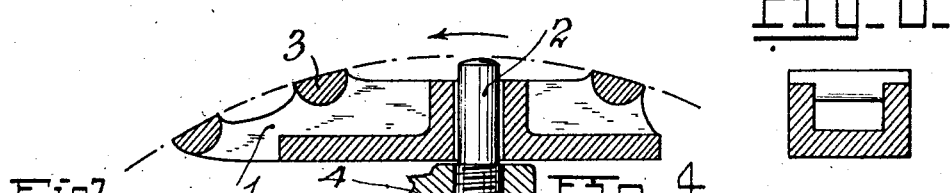
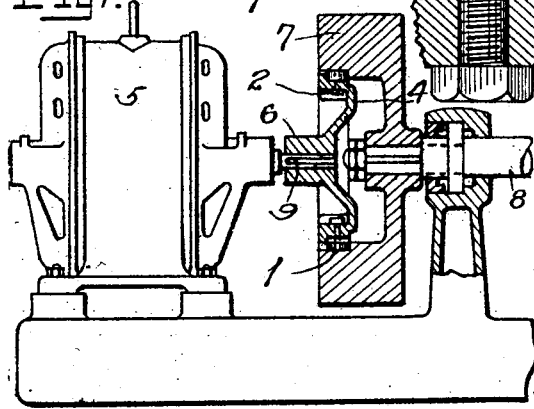
Inventors
J. W. A. Elling
B. Heger
By Marks & Clerk Attys Patented Nov. 22, 1927.

1,650,201

UNITED STATES PATENT OFFICE.

JENS WILLIAM ÆGIDIUS ELLING, OF CHRISTIANIA, AND BJÖRN HEGER, OF VESTRE AKER, NEAR CHRISTIANIA, NORWAY.

CENTRIFUGAL FRICTION COUPLING.

Application filed November 30, 1923, Serial No. 677,808, and in Norway December 5, 1922.

Our invention relates to centrifugal friction couplings of the kind in which the power shaft is provided with friction members which are pressed against an interior friction face integral with the driven shaft by centrifugal force so as to carry the latter along with it when the power shaft has reached a predetermined velocity.

The couplings of this kind have some defects, the most prominent of which is the difficulty of preventing the friction pieces from being unduly heated when for some reason or other there is slippage between the driven part and the driving part, while the driving part is continuing its rotation.

Another important defect resides therein that the carrier member fastened to the driving shaft, when the coupling has been used sufficiently long, is liable to wear out in the friction pieces or clamps a groove of such form that there is a danger of the friction pieces becoming jammed between their carrier and the friction face of the driven part.

The object of our invention is to provide a friction piece free of the defects mentioned above and also to obtain some other advantages in couplings of the kind above mentioned, which shall be further explained in the following.

In the following we shall describe our invention with reference to the accompanying drawings, in which—

Fig. 1 is a longitudinal section on line 1—1 in Fig. 2 of a friction piece in accordance with the invention.

Fig. 2 is a plan view of the friction piece and

Fig. 3 is a cross section on line 3—3 in Fig. 2.

Fig. 4 is a sectional elevation of a modified form of friction piece, taken on line 4—4 of Fig. 5.

Fig. 5 is a plan view of the friction piece illustrated in Fig. 4.

Fig. 6 is a sectional view taken on line 6—6 of Fig. 5.

Fig. 7 is a vertical sectional view of the entire coupling, driven by a motor.

The general arrangement of the centrifugal coupling is illustrated in Fig. 7, which shows the work shaft of a circular saw or the like driven from an electric motor by the aid of the centrifugal friction coupling forming the subject-matter of the present invention.

5 is the electric motor, to whose shaft 9 is fastened a hub 6 carrying the arms 4 of the centrifugal friction coupling. The ends of these arms carry the bolts 2 on which the friction or clamping pieces 1 slide. When the electric motor is started, the friction pieces 1 are thrown outwards toward the inner face of a friction disk 7 fastened to the end of the work shaft, eventually causing this disk to rotate with the shaft of the motor. In the arrangement shown, the friction disk 7 functions in known manner, as a fly-wheel for the shaft 8.

Referring now to Figs. 1 to 3, 1 is the friction or clamping piece and 2 is the part of the carrier member, on which the clamping piece is mounted. The interior friction face of the driven member 7 is indicated in Figures 1 and 4 with a broken circular line and the direction of rotation with an arrow in Fig. 1. Now according to our invention this friction piece 1 is formed in such a way that the heat generated through the friction on its friction face owing to slipping is distributed by the aid of air gaps so as to prevent the temperature from rising so far as to be dangerous. In the preferred forms illustrated the friction face is subdivided into two or more sections or ribs 3 of comparatively small peripheral width with intervening air gaps. These ribs as shown are arranged transversely to the direction of movement so as to prevent the formation of long, smooth surfaces excluding the air. The friction piece therefore preferably is given the form of a rib-shaped body giving the air free access to the parts heated by the friction.

In the form shown in Figs. 4, 5 and 6, the friction piece is given a channel-shaped cross section.

In order to avoid the risk of the coupling being jammed by the friction piece carrier wearing out a groove in its underside the part 2 of the carrier engaging the friction piece is given such a position in relation to the part of the friction piece with which it engages that this part 2 (preferably a screw bolt) reaches so far above the said part (the hub) of the friction piece that a jamming effect by wear is made impossible. If by excessive wear the bolt 2 should wear a groove right through the hub part of the friction piece, the only consequence hereof will be, that the friction piece will be wholly released from the carrier, causing the machine to stop, and thereby signalling the irregularity.

In the preferred form of the coupling the carrier bolt 2 is threaded through the carrier body proper 4 from within, as illustrated in Figs. 1 and 4, whereby even if the bolt 2 should loosen, it will be kept in place by the influence of the centrifugal force.

Claim:

In a centrifugal friction coupling, a power shaft, a driven shaft, an annular clutch member secured to said driven shaft, said member being provided with an interior friction face, a carrier on the power shaft, and channel-shaped friction pieces adapted to cooperate with said clutch member, said friction-pieces being loosely mounted on said carrier and provided with air gaps in their friction faces.

In testimony that we claim the foregoing as our invention, we have signed our names.

JENS WILLIAM ÆGIDIUS ELLING.
BJÖRN HEGER.